Patented May 1, 1945

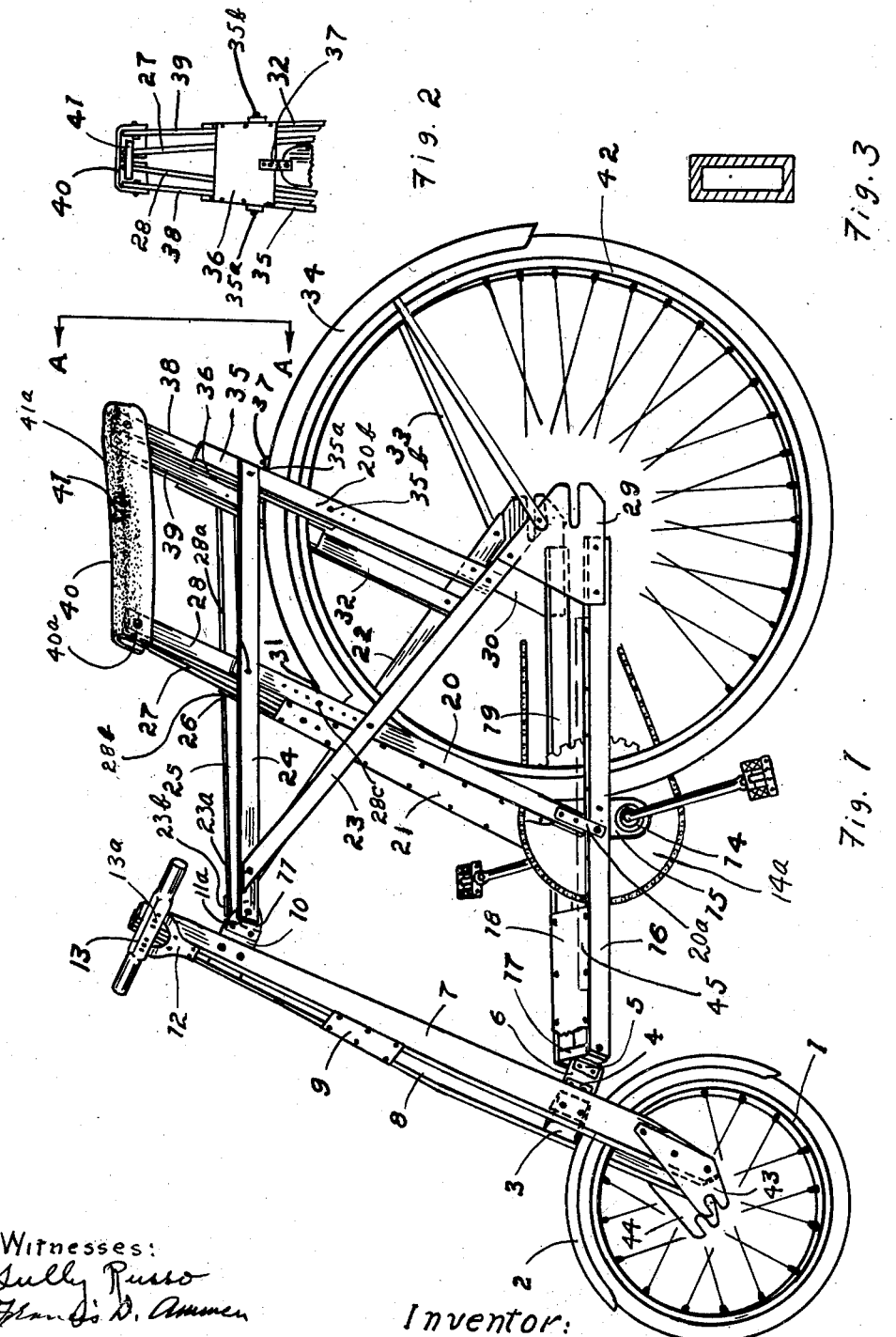

2,374,878

UNITED STATES PATENT OFFICE 2,374,878

VEHICLE FRAME

Elmo L. Moeller, Santa Monica, Calif.

Application December 27, 1943, Serial No. 515,637

1 Claim. (Cl. 280—281)

This invention relates to vehicle frames, and is particularly applicable in the construction of bicycle frames.

Heretofore, bicycle frames have been almost universally constructed of metallic tubing. This necessitates many operations in connecting up the sections of tube that compose the frame, and the building of a frame in that way is the source of a considerable part of the expense of building a bicycle.

One of the objects of the present invention is to provide a frame construction for a vehicle, and particularly a bicycle, which will avoid the necessity for employing tubing as a structural shape; and having features of construction which particularly adapt it to being fabricated from elements having flat side faces. This particularly adapts the frame to be manufactured of wood, but also adapts it to be manufactured of rectangular shaped members, the flat sides of which facilitate the attachment of the elements of the frame to each other by very simple means, and enabling the vehicle frame of this character to be manufactured at relatively low cost.

Another object of the invention is to provide a construction involving the connection of the steering head to the front portion of the frame, which will permit ample movement of the steering head in steering the vehicle, but which will avoid the necessity for the usual ball bearings that are generally employed at this point, and which considerably increase the expense of a bicycle frame.

Another object of the invention is to provide a construction which will eliminate the use as far as possible, of metal structural parts in the complete assembly, even including the seat post or posts on which the saddle of the bicycle frame is supported.

Another object of the invention is to provide a vehicle frame that substantially avoids the use of metal frame members, but which will be a very light, strong frame.

Further objects of the invention will appear hereinafter.

The invention consists in the novel parts and combination of parts to be described hereinafter, all of which contribute to produce an efficient vehicle frame.

A preferred embodiment of the invention is described in the following specification, while the broad scope of the invention is pointed out in the appended claim.

In the drawing:

Fig. 1 is a perspective illustrating my invention as applied in the construction of a bicycle frame.

Fig. 2 is a rear elevation of the bicycle saddle and its supporting parts, to illustrate the preferred details of construction at this point.

Fig. 3 is a cross-section illustrating the structural shape of a frame member that I may employ if the elements of the frame are formed of a plastic material, or of a light metal such as aluminum, or magnesium.

Before proceeding to a more detailed description of the bicycle frame embodying my invention, it should be stated that one of the principal features of the invention is the employment of flat-sided members or bars which are employed in general in the construction of the frame, in pairs disposed opposite to each other and in parallel or in converging relation; and the employment also of relatively thin plate-like members or sheets of relatively thin and light metal, that are attached to these opposed elemental frame members. This construction is employed in the steering head and in the lower fork, and also in the other frame members that are connected together to form the complete frame.

Referring more particularly to the parts, 1 indicates the front wheel which is preferably of relatively small diameter, and mounted rotatably at the lower end of a steering column or fork comprising a pair of relatively straight side members or bars 7 and 8. The wheel is equipped with a mud guard 2. Near their lower ends and just above the mud guard 2 the side members or bars 7 and 8 are separated by a spacer block 3 formed of wood or similar material.

Instead of providing a ball bearing for connecting the lower portion of this steering column to the forward end of the body of the frame, I prefer to make this connection by employing a small flexible sheet 6 of material such as leather, rubberized fabric, heavy canvas, or similar material that is sufficiently pliable to form a hinge and permit rotation of the steering column on its own longitudinal axis, or more accurately, about the mid portion of the sheet 6 as an axis. The forward edge of this sheet hinge 6, is attached by means of small clips 4 to the rear portions of block 3, the flat faces of which are of course disposed in a front and rear direction. The rear end of the flexible hinge member 6 is secured in place by employing small angle clips 5 which are attached to block 11, or the forward end of the lower fork of the frame, as will be described hereinafter.

A relatively thin spacer 10 is secured between the upper portions of the side members 7 and 8 which comprise the steering column. The spacer 10 is formed of leather or canvas belting similar to the sheet hinge 6 and extends rearwardly of the steering column to form an upper hinge. Small rearwardly tapering clips or plates 11 of reinforced sheet plastic or sheet metal are secured to the rearwardly projecting portion of the spacer or upper hinge 10. The plates 11 are in turn attached to the adjacent part of the frame, to be presently described.

In order to increase the rigidity of the steering column, I prefer to connect its side members or bars 7 and 8 at their forward edges, by a relatively thin plate or sheet 9 of suitable material. This sheet may be attached directly to the front edges, or if desired, it may have flanges at its edge, attached to the sides of the bars 7 and 8. Furthermore, if desired, a similar plate 9 may be employed for connecting the rear edges of the bars 7 and 8. This plate 9 and other plates similar to it, are employed generally for connecting up and holding in spaced relation oppositely disposed flat-sided frame members that I employ in constructing the frame. At the upper end of the steering column, a yoke 12 is secured to the side bars 7 and 8, and to the upper end of this yoke the handle bar 13 is rigidly secured. Handle bar 13 is also secured directly to the side members or bars 7 and 8 with screws 13a, and metal angle clips, if desired.

A crank assembly 14 is supported by a pair of downwardly extending hanger plates 15, suspended from a pair of side members 16 and 19 forming the lower fork of the frame. The forward ends of the side members 16 and 19 are joined by a cross block 17. The angle clips 5 already described, are attached to the forward side of this spacer block 17. Forward of the sprocket wheel 14a a transversely disposed connector plate 18 is provided, that is attached to the upper edges of the side members 16 and 19. In Fig. 1, the forward edge of this plate is represented as broken away, but in practice, it should extend up to, and over, the block 17 to which it would be attached.

From the upper side of the lower fork formed by the side members 16 and 19, substantially upright frame members 20 and 26 extend, said frame members being fastened to the frame members 16 and 19 with small metal plates 20a. The upright frame members 20 and 26 converge toward each other in an upward direction, and terminate at top of horizontal frame members 24 and 25.

At the forward side and adjacent to the sprocket 14a, the upright side members 20 and 26 have a relatively thin tapered plate 21 attached to their forward edges. The upright side members 20 and 26 have extensions 28 and 27 respectively, which overlap them on their inner sides and are attached to them by bolts 28a which also serve to secure the upright frame members 20 and 26 to the horizontal frame members 24 and 25. The upper horizontal frame members 24 and 25 are attached at their forward ends to the upper flexible spacer and hinge member 10. The horizontal frame members 24 and 25 are not parallel to each other, but diverge from each other in a rearward direction, their rear ends being attached to rearwardly disposed substantially upright frame members 32, and 35. The forward upright frame members 20 and 26 and the rearward upright frame members 32 and 35 are substantially parallel. The upper ends of the rearward upright frame members 32 and 35 are attached to extension bars 39 and 38 respectively, by bolts 35a. These bolts 35a can be applied to any one of a plurality of openings 20b and similar openings 20a are provided in the forwardly disposed upright frame members 20 and 26, to enable the extension bars 27 and 28 to be adjusted up or down. A seat or saddle member 40 connects the upright extensions 27 and 28 with the extensions 38 and 39, and is adjusted thereby to any height desired.

A relatively thin connecting plate 36 which would be formed of any suitable strong and thin material, forms a light transverse connecting member between the upright members 20 and 26, substantially as shown in Fig. 2.

Diagonal brace members 22 and 23 are provided, and converge in an upward direction, their forward ends being attached by bolts 23a to the side bars 24 and 25, respectively.

The brace members 22 and 23 diverge in a downward direction, and their lower ends are rigidly secured respectively, to gusset plates 29 and 30, one on each side, and the lower edges of these gusset plates are attached respectively, to the lower horizontal side members 16 and 19 of the lower horizontal fork.

The lower ends of the rearward upright frame members 32 and 35 are secured by bolts to the diagonal bars 22 and 23.

Referring to Fig. 2, in connection with Fig. 1, the upper ends of the extension bars 27 and 28 lie close together and are not connected together. A wooden block 41 (see dotted lines in Fig. 1, and view from rear in Fig. 2) is provided to spread the seat 40 to a comfortable width. It is fastened to inside of seat 40 by wood screws 41a. The saddle 40 is of inverted U-shape with downwardly extending side flanges that are attached by bolts 40a to the upper ends of the extension members 27, 28, 38 and 39. The bolts 35a and 35b are small bolts passing through frame members 24, 35, 38, and 25, 32, 39, respectively.

The rearward upright frame members 32 and 35 are spread sufficiently apart to enable a rear mud guard 34 to be put in position. The forward end of this mud guard is attached with clip 31 to the rear side of the plate 21, and by means of a small bracket 37, attached to the rear connecting plate 36. Its rear end is held in place by two braces 33, the lower ends of which are attached to the gusset plates 29 and 30.

While I have illustrated the frame of this bicycle as constructed of relatively thin flat bars, it should be understood that instead of using bars of rectangular cross-section, they may be of square cross-section, or any other cross-section that will enable the bars to present flat faces to come together at points where the frame members are connected to each other.

And, furthermore, if desired, instead of constructing the frame of wood, it can be made of other material having a rectangular cross-section such as illustrated in Fig. 3. In this case, the bars would be made of plastic, or any other similar material.

It will be noted that the relatively thin plates I employ for connecting the elemental frame bars, extend each in a plane that is transverse to the front-and-rear medial plane of the frame, and for this reason they give desirable rigidity to the frame.

It will be evident that this frame can readily be constructed from flat-sided bars, and can be manufactured without special equipment and without necessitating brazing operations and similar operations that are now employed in connecting up the frame members of tubular bicycle frames.

What I claim is:

A vehicle frame having a substantially horizontal lower frame member extending in a front-and-rear direction, a forwardly disposed substantially upright frame-member supported on said horizontal frame-member, a diagonal brace-member extending across said forward frame-member and attached thereto, means connecting the lower portion of said diagonal brace-member to said horizontal member, a rearward substantially upright frame-member attached at its lower end to said diagonal member, said forward and rearward upright frame members each composed of a pair of flat-sided bars converging toward each other in an upward direction, a saddle member connecting the upper ends of said substantially upright frame members, and a relatively thin plate-like connecting member for each of said upright frame-members, extending in a plane transversely with respect to the front-and-rear medial plane of the frame, and attached to the said bars of each of said upright members, so as to fix them in spaced relation to each other a substantially horizontal upper frame member attached to the diagonal brace forwardly, and to the two upright members, and composed of two spaced bars.

ELMO L. MOELLER.